UNITED STATES PATENT OFFICE.

WILLIAM W. CROOKER, OF LYNN, MASSACHUSETTS, ASSIGNOR TO CROOKER BLACKING COMPANY, OF LYNN, MASSACHUSETTS, A CORPORATION OF MAINE.

LEATHER-FINISHING COMPOSITION AND PROCESS OF MAKING THE SAME.

No. 848,445. Specification of Letters Patent. Patented March 26, 1907.

Application filed February 6, 1906. Serial No. 299,781.

*To all whom it may concern:*

Be it known that I, WILLIAM W. CROOKER, of Lynn, in the county of Essex and State of Massachusetts, have invented certain new and useful Improvements in Leather-Finishing Composition and Processes of Making the Same, of which the following is a specification.

This invention relates to compositions known as "blackings," "dressings," and "stains" used in the operation of brushing, burnishing, and polishing heels and edges and bottoms of soles of boots and shoes, such compositions including an alkaline emulsion of wax, which is usually wax emulsified by the use of a suitable substance having alkaline reaction, a suitable gum-like substance, such as gum-arabic or shellac, in an alkaline or other solution, and coloring-matter, also in solution, the composition having a suitable proportion of water to give the requisite fluidity. When this composition is applied to a leather surface to be finished and a burnishing friction is applied to such surface, a brilliant gloss is raised upon the surface. Heretofore finishing compositions of this kind have been put upon the market in liquid form ready for use. The liquid composition has to be stored in barrels or other liquid-tight packages and involves considerable expense and loss to the manufacturer and user by reason of waste, leakage, freezing, and cost of transportation.

My invention has for its object to obviate this expense and loss and to enable the user of the composition to prepare the same for use in limited quantities, such as may be required for consumption in a day or other limited period.

The invention consists in the new composition of matter and in the method of producing the same, hereinafter described and claimed, the said composition being a desiccated burnishing-powder having all the essential ingredients of the composition above described, with the water removed by evaporation and the residual material reduced to a fine powder, which readily forms an emulsion in water and is adapted to be converted into a liquid composition by the addition of a suitable percentage of water.

In carrying out my invention I prepare in the usual or any suitable way the ordinary burnishing composition of commerce. Said composition contains a vegetable or other suitable wax, such as palm or carnauba-wax, emulsified in an alkaline substance, such as a superalkaline soap in solution. The composition also contains coloring-matter, such as a soluble anilin color, and a gum-like substance, such as shellac or gum-arabic, dissolved, preferably, by an alkaline substance, such as a solution of borax. The whole is reduced to a suitable liquid consistency by water or other liquid. I then evaporate the liquid from the composition by exposing the same to the action of the air, either at its natural temperature or by the aid of heat, until nothing remains but the solid matter. This residuum is then pulverized, ground, or otherwise reduced to a powder, which is preferably so fine as to be impalpable. This desiccated emulsifiable blacking or coloring material constitutes my improved composition of matter and may be put upon the market in suitable packages. When required for use, it is mixed with a suitable quantity of water heated to such temperature as will readily take up the powder.

As a specific example of one way of practicing my invention, although I desire it understood that I do not limit myself to the substances and proportions below specified, I may take of vegetable wax one pound; soap, two and one-half ounces; water, one gallon. The wax is emulsified by the action of the soap, and the whole is mixed, forming a liquid emulsion. To the above-described wax emulsion is added a coloring-matter in solution, consisting of one and one-half pounds of anilin color and one gallon of water. I next prepare a gum-solution composed of one pound of gum shellac, four ounces of borax, and one gallon of water. The said gum solution is then added to the above-described mixture, which is now ready for the evaporating process, which removes the liquid.

It will be seen that this powdered composition is greatly reduced in weight compared with the liquid composition, so that the expense of transportation is correspondingly reduced. Moreover, it cannot be injuriously affected by cold and may be kept in packages which are not necessarily liquid-tight without liability of waste. The user is enabled to make up the blacking or coloring composition for use in relatively small quantities, so that freshly-prepared material can always be kept on hand.

It is obvious that the several ingredients of the composition may be treated separately instead of being first mixed and reduced to the operative consistency of the completed blacking and then treated as a whole to convert it into a powder. In other words, the wax, the gum-like substance, and the coloring-matter may be separately dissolved, evaporated, and powdered.

I claim—

1. As a composition of matter, a powdered, emulsifiable, desiccated blacking or coloring composition containing an intimate mixture of wax, and an emulsifying ingredient.

2. As a composition of matter, a powdered, emulsifiable, desiccated blacking or coloring composition containing an intimate mixture of wax, a suitable gum-like substance, an emulsifying ingredient, and coloring-matter.

3. The process hereinbefore described of making an emulsifiable, desiccated blacking or coloring composition, the same consisting in emulsifying a vegetable wax by the use of alkaline matter to form a liquid emulsion, mixing therewith a liquid solution of a suitable gum-like substance and coloring-matter, evaporating the liquid constituents of the composition to produce a dry residuum, and powdering the said residuum.

4. In the process of making an emulsifiable desiccated blacking or coloring composition, the improved step which consists in emulsifying wax by the use of a suitable alkaline matter in water, drying the same by evaporation, and powdering the residuum.

5. In the process of making an emulsifiable desiccated blacking or coloring composition, the improved step which consists in making an alkaline solution of shellac by the use of a suitable alkali, drying the same by evaporation, and powdering the residuum.

In testimony whereof I have affixed my signature in presence of two witnesses.

WILLIAM W. CROOKER.

Witnesses:
C. F. BROWN,
E. BATCHELDER.